United States Patent
Katagai et al.

(10) Patent No.: US 10,734,796 B2
(45) Date of Patent: Aug. 4, 2020

(54) FLAT WIRING STRUCTURE

(71) Applicant: TOYOTA JIDOSHA KABUSHIKI KAISHA, Toyota-shi, Aichi-ken (JP)

(72) Inventors: Toshio Katagai, Toyota (JP); Hidehiko Matsui, Nagoya (JP); Shinji Oshita, Toyota (JP); Atsuyuki Wakamatsu, Anjo (JP); Hiroki Kawakami, Okazaki (JP); Kazunori Takata, Toyota (JP); Shin Umehara, Susono (JP); Taku Furuta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 16/149,761

(22) Filed: Oct. 2, 2018

(65) Prior Publication Data
US 2019/0165558 A1    May 30, 2019

(30) Foreign Application Priority Data
Nov. 27, 2017 (JP) .................................. 2017-226852

(51) Int. Cl.
*H02G 5/02* (2006.01)
*H01B 9/00* (2006.01)
(Continued)

(52) U.S. Cl.
CPC .............. *H02G 5/02* (2013.01); *H01B 7/0018* (2013.01); *H01B 9/006* (2013.01); *B60R 16/03* (2013.01); *H01B 7/0045* (2013.01)

(58) Field of Classification Search
CPC ...... H01B 7/08; H01B 7/0045; H01B 7/0018; H01B 9/006; H01B 7/00; H01B 7/009;
(Continued)

(56) References Cited

U.S. PATENT DOCUMENTS 6,261,683 B1 *  7/2001  Tanaka ................. H01B 7/0861
                                                    174/117 F
6,495,764 B1 * 12/2002  Hori .................... H01B 7/0861
                                                    174/117 F
(Continued)

FOREIGN PATENT DOCUMENTS

JP          2017-136926 A       8/2017

OTHER PUBLICATIONS

Anette Sedlmaier-Fuchs et. al., "New Approach to Energy Distribution Backbone Architecture as Enabler for Innovative Vehicle Electrical Systems", ATZ elektronik, vol. 9, p. 30-34, 2014.

*Primary Examiner* — Angel R Estrada
(74) *Attorney, Agent, or Firm* — Oliff PLC

(57) ABSTRACT

A flat wiring structure is including a plurality of layers, and includes a power supply layer, and a first ground layer and a second ground layer laminated with the power supply layer sandwiched therebetween. In a plan view of the flat wiring structure when viewed from a direction along a lamination direction of the first ground layer, the power supply layer, and the second ground layer, the power supply layer has a width in a short direction smaller than those of the first ground layer and the second ground layer, and the power supply layer is provided at a position covered with the first ground layer and the second ground layer.

4 Claims, 4 Drawing Sheets

(51) Int. Cl.
*H01B 7/00* (2006.01)
*B60R 16/03* (2006.01)

(58) Field of Classification Search
CPC ... H01B 7/04; H02G 5/02; H02G 5/00; H05K 7/06; H05K 7/00; B60R 16/03; B60R 16/00
USPC .................. 174/68.1, 68.3, 117 F, 117 FF
See application file for complete search history.

(56) References Cited

U.S. PATENT DOCUMENTS

| | | | |
|---|---|---|---|
| 7,898,355 B2 * | 3/2011 | Lee .................. | H05K 1/0219 333/1 |
| 9,485,892 B2 * | 11/2016 | Nakata .................. | H01B 7/08 |
| 10,381,751 B2 * | 8/2019 | Sayo .................. | H01R 11/12 |
| 10,468,161 B2 * | 11/2019 | Kominato ........... | B60R 16/0215 |

* cited by examiner

FLAT WIRING STRUCTURE

INCORPORATION BY REFERENCE

The disclosure of Japanese Patent Application No. 2017-226852 filed on Nov. 27, 2017 including the specification, drawings and abstract is incorporated herein by reference in its entirety.

BACKGROUND

1. Technical Field

The present disclosure relates to a structure of a flat wiring including a plurality of layers.

2. Description of Related Art

For example, Japanese Unexamined Patent Application Publication No. 2017-136926 (JP 2017-136926 A) discloses a strip-shaped flat wiring that is formed by superimposing a power supply layer (bus bar for power supply) and a ground layer (bus bar for ground) in a thickness direction.

SUMMARY

For example, as shown in FIG. 6, in a case where a flat wiring 100 having a two-layered structure of a power supply layer 110 and a ground layer 120 is closed to a conductor 240 (for example, a vehicle body sheet metal or the like), a part of normal mode noise generated in the flat wiring 100 leaks to the conductor 240 through stray capacitance 230, and common mode noise (conductive noise) may be generated in the conductor 240.

In a case where the flat wiring 100 having the two-layered structure described above is close to the conductor 240, as shown in FIG. 7, a part of a plurality of electric lines of force 300 radiated from the power supply layer 110 may be coupled to the conductor 240, instead of the ground layer 120, and radiation noise may be generated in the conductor 240.

Accordingly, in order to suppress common mode noise or radiation noise that is generated in the conductor, there is room for improvement in the structure of the flat wiring.

The disclosure provides a structure of a flat wiring capable of suppressing noise that is generated in a conductor.

An aspect of the disclosure relates to a flat wiring structure including a plurality of layers. The flat wiring structure includes a power supply layer, and a first ground layer and a second ground layer laminated with the power supply layer sandwiched between the first ground layer and the second ground layer. In a plan view of the flat wiring structure when viewed from a direction along a lamination direction of the first ground layer, the power supply layer, and the second ground layer, the power supply layer has a width in a short direction, which is a direction perpendicular to a longitudinal direction, smaller than those of the first ground layer and the second ground layer, and the power supply layer is provided at a position covered with the first ground layer and the second ground layer.

The flat wiring according to the aspect of the disclosure has a three-layered structure in which the power supply layer is sandwiched between the first ground layer and the second ground layer. With the three-layered structure, for example, normal mode noise that is propagating from equipment connected to the flat wiring through the power supply layer is easily fed back to the equipment through the ground layers compared to the two-layered structure of the related art. Accordingly, it is possible to reduce a noise current that leaks and flows from the ground layers to a conductor (for example, a vehicle body sheet metal or the like) close to the flat wiring through stray capacitance or the like. Therefore, it is possible to suppress common mode noise that is generated in the conductor.

The flat wiring according to the aspect of the disclosure has a structure in which, in the short direction, the width of the power supply layer sandwiched between the first ground layer and the second ground layer is smaller than the width of the first ground layer and the width of the second ground layer. With the structure, electric lines of force radiated from the power supply layer are easily coupled to the first ground layer or the second ground layer. Accordingly, it is possible to reduce electric lines of force that are coupled to the conductor (for example, a vehicle body sheet metal or the like) close to the flat wiring. Therefore, it is possible to suppress radiation noise that is generated in the conductor.

In the flat wiring structure according to the aspect of the disclosure, the width of the first ground layer in the short direction and the width of the second ground layer in the short direction may be set to be equal to or greater than two times the width of the power supply layer in the short direction.

In a case where the width of the power supply layer is set as described above, it is possible to more effectively suppress coupling of electric lines of force radiated from the power supply layer to the conductor (for example, a vehicle body sheet metal or the like) close to the flat wiring.

In the flat wiring structure according to the aspect of the disclosure, the power supply layer may be a strip-shaped flat plate member made of a conductive metal material. The first ground layer may be a strip-shaped flat plate member made of a conductive metal material. The second ground layer may be a strip-shaped flat plate members made of a conductive metal material.

In the flat wiring structure according to the aspect of the disclosure, the first ground layer and the power supply layer may be electrically insulated from each other, and the power supply layer and the second ground layer may be electrically insulated from each other.

With the structure of the flat wiring according to the aspect of the disclosure described above, it is possible to suppress noise that is generated in a conductor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Outline

A flat wiring of the disclosure has a three-layered structure in which the power supply layer is sandwiched between the two ground layers, the width of the power supply layer is made smaller than the width of each ground layer. With the structure, normal mode noise generated in the power supply layer easily flows to the ground layers. Accordingly, it is possible to suppress noise that leaks to the conductor close to the flat wiring through stray capacitance or the like. With the structure, electric lines of force radiated from the power supply layer are easily coupled to the ground layers. Therefore, it is possible to suppress noise that is radiated from the flat wiring to the conductor.

Configuration

Figure 1:
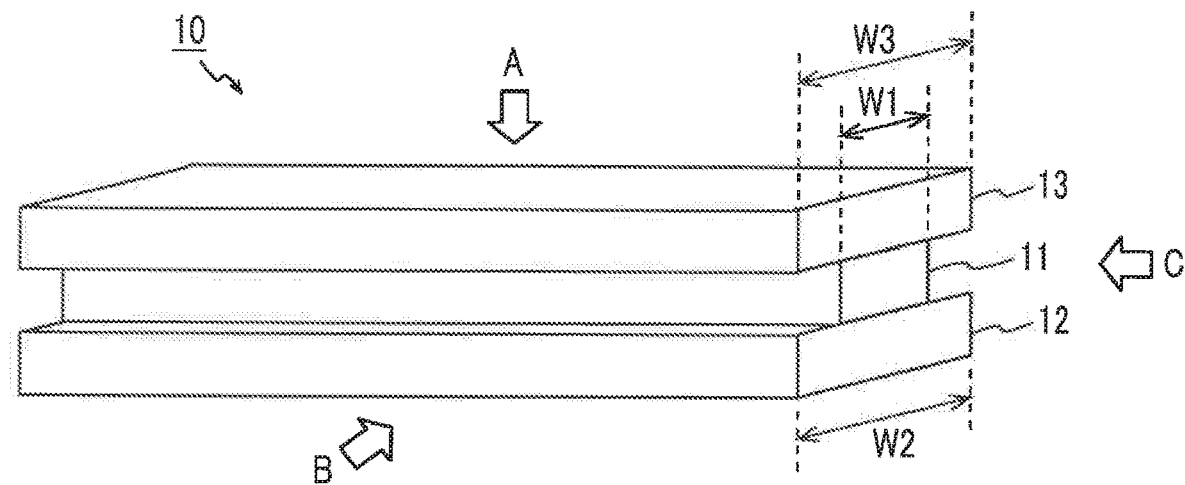
FIG. 1 is a partial perspective view illustrating a structure of a flat wiring according to an embodiment of the disclosure.

FIG. 1 is a partial perspective view illustrating a structure of a flat wiring 10 according to an embodiment of the disclosure. The flat wiring 10 according to the embodiment shown in FIG. 1 includes a power supply layer 11, a first ground layer 12, and a second ground layer 13. The flat wiring 10 can be used as, for example, an electric wiring cable of a wire harness mounted in a vehicle or the like.

The power supply layer 11 is, for example, a strip-shaped flat plate member made of a conductive metal material, such as iron, copper, or aluminum. The power supply layer 11 is used as, for example, an electric wiring for supplying power to a load, such as an electronic control unit (ECU) (not shown), electrically connected to the flat wiring 10.

The first ground layer 12 is, for example, a strip-shaped flat plate member made of a conductive metal material, such as iron, copper, or aluminum. The first ground layer 12 is used as, for example, a ground (GND) potential of a load, such as an electronic control unit (not shown), electrically connected to the flat wiring 10.

Similarly to the first ground layer 12, the second ground layer 13 is, for example, a strip-shaped flat plate member made of a conductive metal material, such as iron, copper, or aluminum. The second ground layer 13 is also used as, for example, a ground (GND) potential of a load, such as an electronic control unit (not shown), electrically connected to the flat wiring 10.

The flat wiring 10 has a structure in which the first ground layer 12, the power supply layer 11, and the second ground layer 13 are laminated in the order. That is, the power supply layer 11 is sandwiched between the first ground layer 12 and the second ground layer 13. The first ground layer 12 and the power supply layer 11, and the power supply layer 11 and the second ground layer 13 are electrically insulated from each other by an insulating layer, an insulating film (not shown), or the like.

As shown in FIG. 1, a width W1 of the power supply layer 11 in a short direction, which is a direction perpendicular to a longitudinal direction, is smaller than a width W2 of the first ground layer 12 in the short direction and a width W3 of the second ground layer 13 in the short direction in a plan view (arrow A of FIG. 1) when viewed from a direction along a lamination direction. In the structure of the flat wiring 10 according to the embodiment, while a useful effect can be exhibited in a case where the width relationship is satisfied, in order to further increase the effect, the width W2 of the first ground layer 12 in the short direction and the width W3 of the second ground layer 13 in the short direction may be set to be equal to or greater than two times the width W1 of the power supply layer 11 in the short direction. The width W2 of the first ground layer 12 in the short direction and the width W3 of the second ground layer 13 in the short direction may be equal to each other or may be different from each other.

As shown in FIG. 1, the power supply layer 11 is provided at a position covered with the first ground layer 12 and the second ground layer 13 in a plan view when viewed from the direction along the lamination direction. That is, the power supply layer 11 is provided to fall within the width W2 of the first ground layer 12 in the short direction and to fall within the width W3 of the second ground layer 13 in the short direction. In particular, the power supply layer 11 is provided at a position to be the center of the first ground layer 12 and the center of the second ground layer 13 in the short direction.

The power supply layer 11, the first ground layer 12, and the second ground layer 13 may be equal or different in thickness in the lamination direction, or any one layer may be different in thickness in the lamination direction.

Operation

Figure 2:
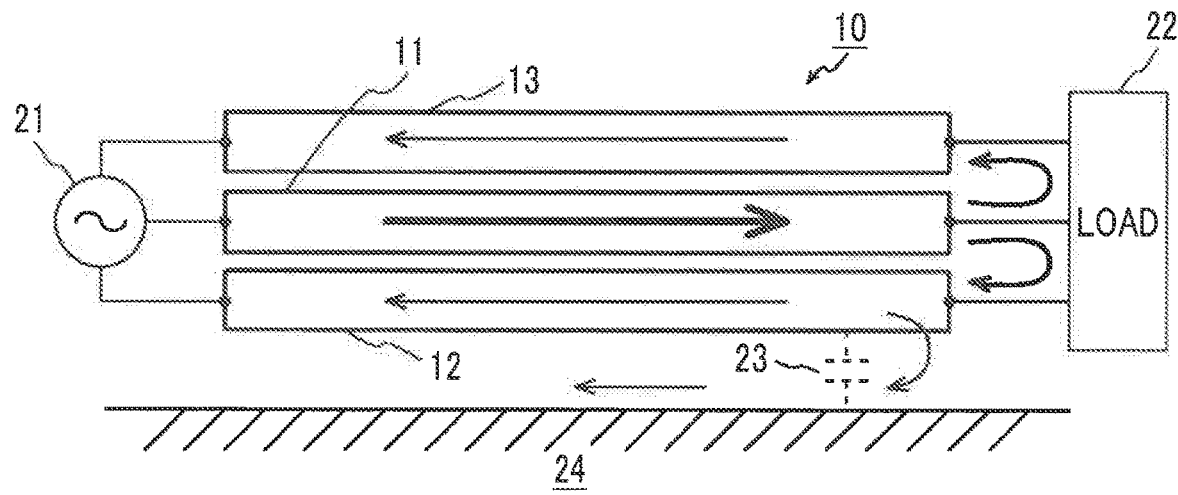
FIG. 2 is a diagram illustrating operation relating to common mode noise in the flat wiring of the embodiment.
Figure 3:
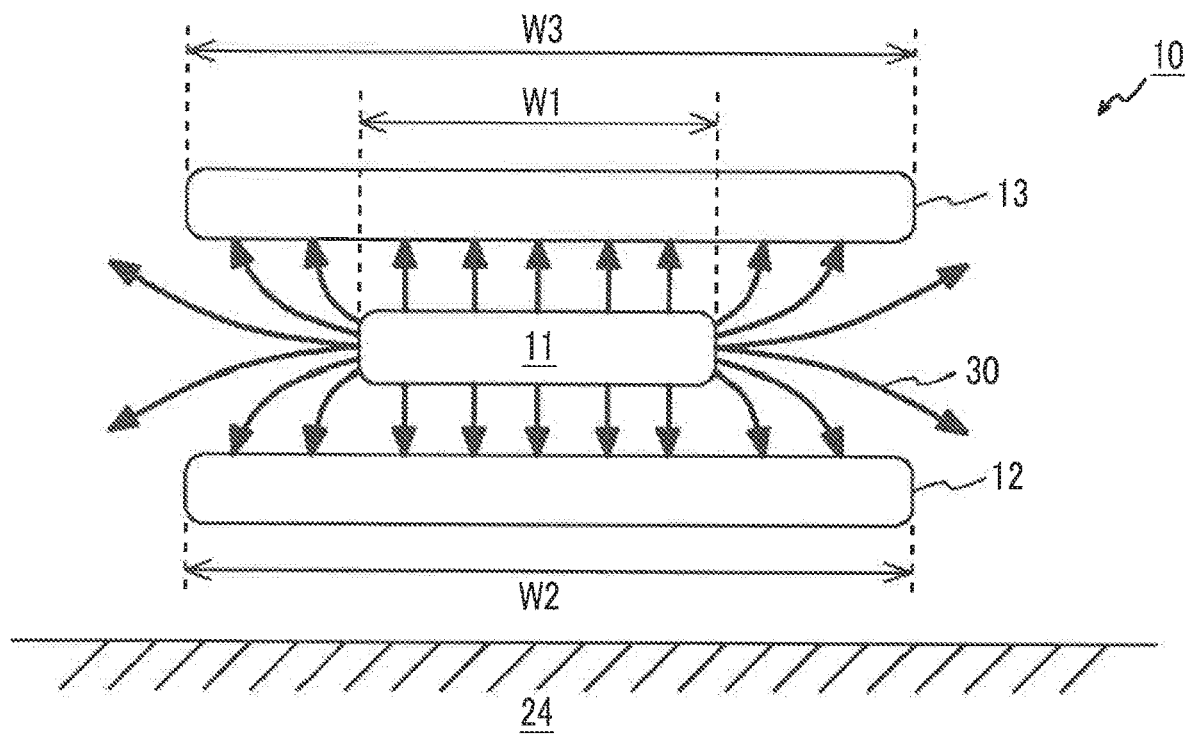
FIG. 3 is a diagram illustrating operation relating to radiation noise in the flat wiring of the embodiment.

Operation that is obtained with the structure of the flat wiring 10 according to the embodiment will be described referring to FIGS. 2 and 3. FIG. 2 is a view in a direction of arrow B in FIG. 1, and is a diagram illustrating operation relating to common mode noise (conductive noise) in the flat wiring 10. FIG. 3 is a view in a direction of arrow C in FIG. 1, and is a diagram illustrating operation relating to radiation noise in the flat wiring 10.

In FIGS. 2 and 3, for ease of understanding of operation, a gap is provided between the first ground layer 12 and the power supply layer 11, and between the power supply layer 11 and the second ground layer 13.

Description will be provided referring to FIG. 2. Normal mode noise generated in a noise source 21 is input to a load 22 due to a noise current that flows through the power supply layer 11 at the center of the flat wiring 10. Noise input to the load 22 returns to the noise source 21 by feeding the noise current back through the first ground layer 12 and the second ground layer 13. At this time, a part of the noise current that flows through the first ground layer 12 close to a conductor 24, such as a vehicle body sheet metal, leaks to the conductor 24 through stray capacitance 23, and the noise current flows to the conductor 24. For this reason, common mode noise (conductive noise) is generated in the conductor 24.

Figure 6:
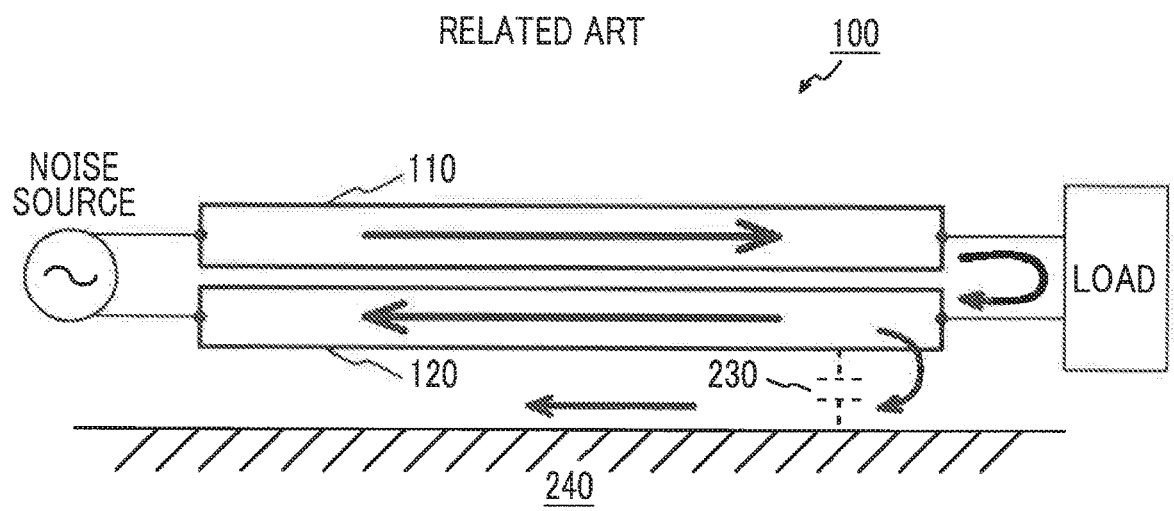
FIG. 6 is a diagram illustrating operation relating to common mode noise in the flat wiring of the related art.
Figure 7:
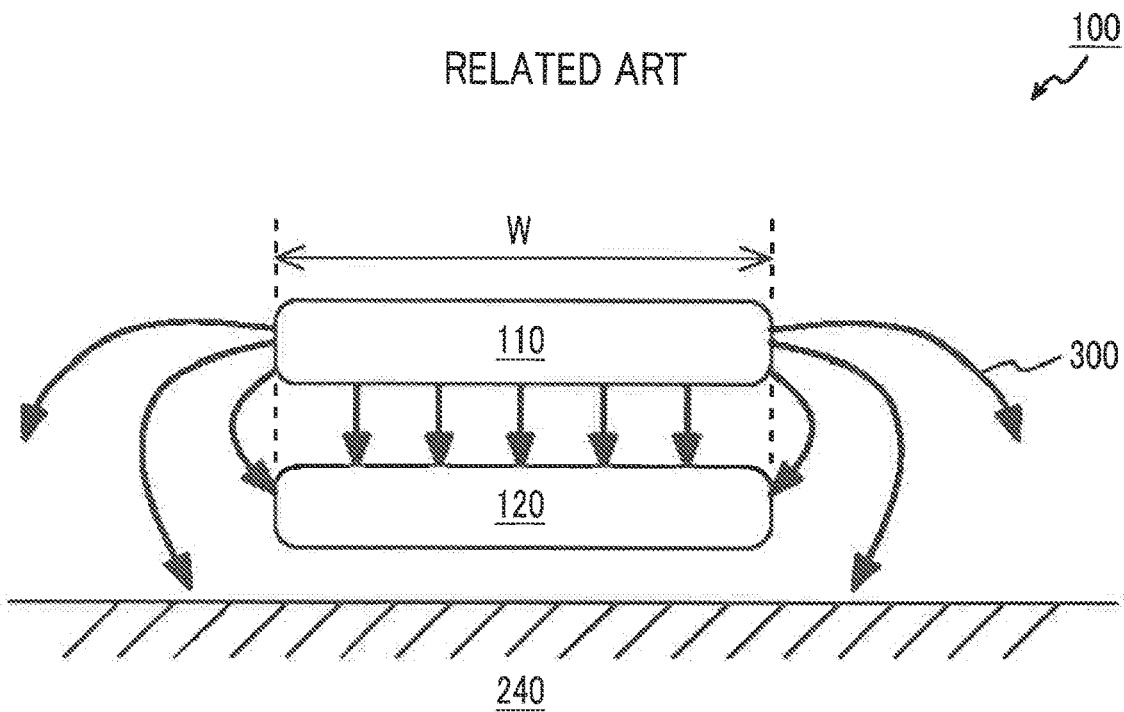
FIG. 7 is a diagram illustrating operation relating to radiation noise in the flat wiring of the related art.

In the three-layered structure of the flat wiring 10 according to the embodiment, a path along which the noise current is fed back from the load 22 to the noise source 21 is increased two times that of the flat wiring 100 (see FIG. 6) of the related art having the two-layered structure. With this, in the flat wiring 10 of the embodiment, the noise current that flows through the first ground layer 12 decreases compared to the flat wiring 100 of the related art, and the noise current that leaks and flows from the first ground layer 12 to the conductor 24 through the stray capacitance 23 also decreases. With the operation, common mode noise that is generated in the conductor 24 is suppressed.

Figure 4:
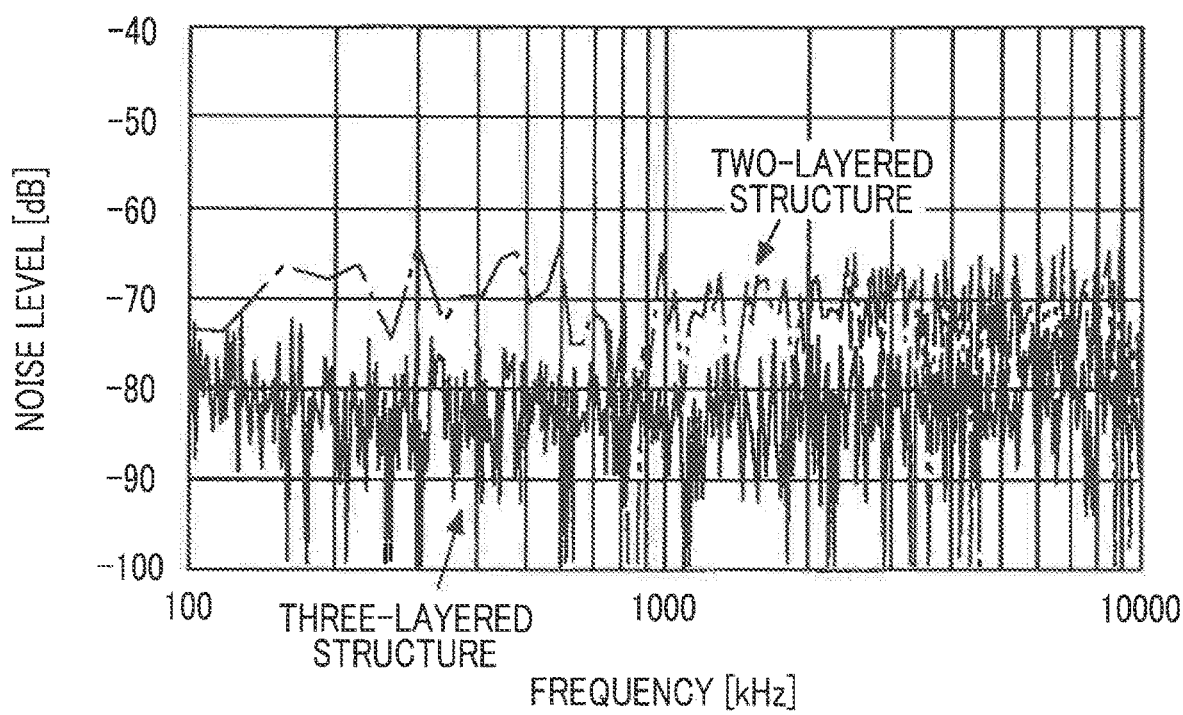
FIG. 4 shows a comparative example of common mode noise in the flat wiring of the embodiment and a flat wiring of the related art.

FIG. 4 shows an experiment result conducted by the inventors. In the experiment result of FIG. 4, it has been confirmed that a noise level (solid line) of the flat wiring 10 according to the embodiment having a three-layered structure is improved about 10 dB within a range of 100 to 10000 kHz compared to a noise level (one-dot-chain line) of the flat wiring 100 of the related art having the two-layered structure.

Description will be provided referring to FIG. 3. A plurality of electric lines of force 30 that is radiated from the power supply layer 11 with a voltage applied between the power supply layer 11 and the first ground layer 12 and between the power supply layer 11 and the second ground layer 13 is coupled to the first ground layer 12, the second ground layer 13, and the conductor 24, such as a vehicle body sheet metal, having a potential lower than the power supply layer 11. At this time, the electric lines of force 30 that are coupled to the conductor 24 become radiation noise.

In the structure of the flat wiring 10 according to the embodiment, the width W1 of the power supply layer 11 in the short direction is smaller than the width W2 of the first ground layer 12 in the short direction and the width W3 of the second ground layer 13 in the short direction. With this, in the flat wiring 10 of the embodiment, the electric lines of force 30 that are radiated from side ends in a width direction of the power supply layer 11 are easily coupled to the first ground layer 12 or the second ground layer 13. With the operation, radiation noise that is generated in the conductor 24 is suppressed.

Figure 5A:
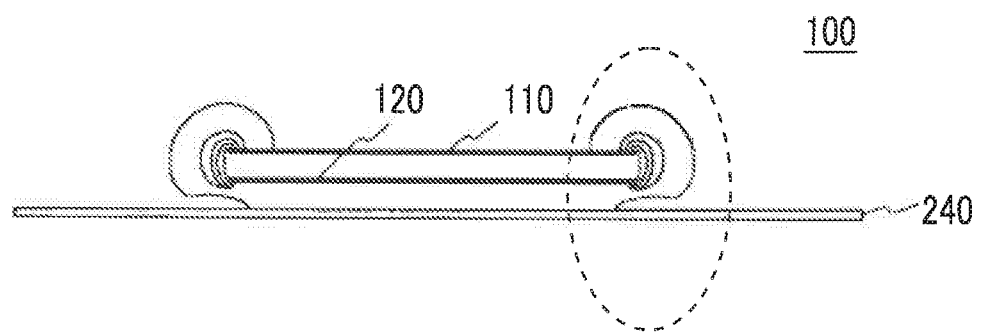
FIG. 5A shows a comparative example of radiation noise in the flat wiring of the related art.
Figure 5B:
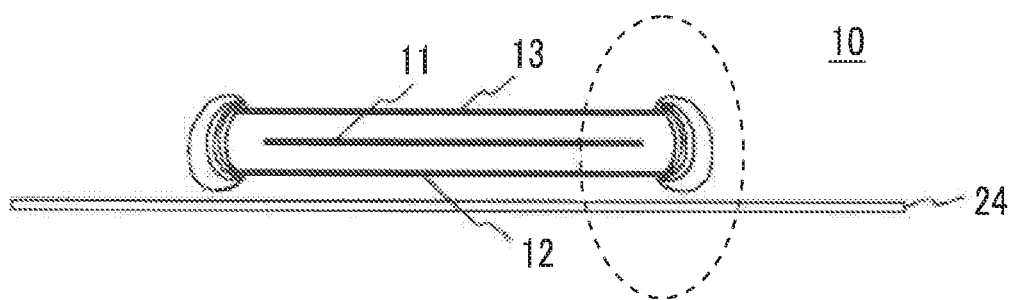
FIG. 5B shows an example of radiation noise in the flat wiring of the embodiment.
Figure 5C:
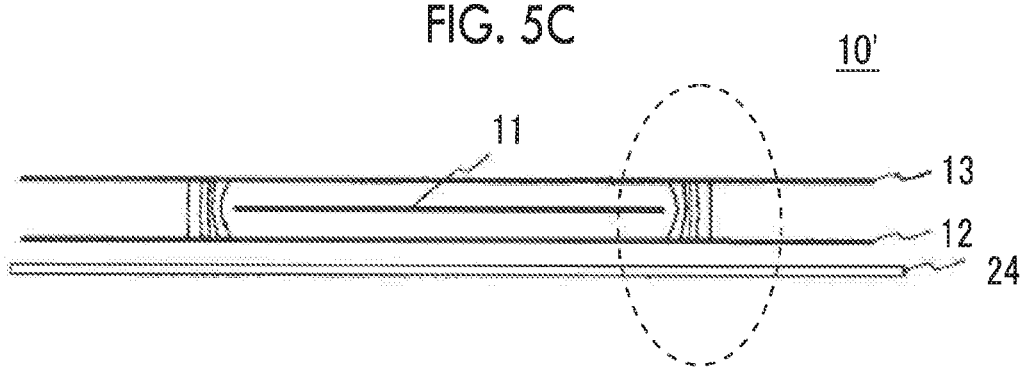
FIG. 5C shows an example of radiation noise in the flat wiring of the embodiment.

FIGS. 5A to 5C shows a simulation result conducted by the inventors. In the simulation result of FIGS. 5A to 5C, it has been confirmed (a dotted-line elliptical place of FIGS. 5A to 5C) that the flat wiring 10 (FIG. 5B) according to the embodiment having a structure, in which the width of the power supply layer 11 in the short direction is made small, is smaller in radiation noise than the flat wiring 100 (FIG. 5A) of the related art having a structure, in which the width of the power supply layer 110 in the short direction and the width of the ground layer 120 in the short direction are the same. In particular, in a flat wiring 10' (FIG. 5C) according to the embodiment in which the width of the first ground layer 12 in the short direction and the width of the second ground layer 13 in the short direction are set to be equal to or greater than two times the width of the power supply layer 11 in the short direction, functional effects appear more remarkably.

Effect

As described above, with the flat wiring 10 according to the embodiment of the disclosure, a three-layered structure in which the power supply layer 11 is sandwiched between the first ground layer 12 and the second ground layer 13 is made, whereby a noise current of a normal mode that flows from the noise source 21 through the power supply layer 11 is easily fed back to the noise source 21 through the two paths of the first ground layer 12 and the second ground layer 13. With this, it is possible to reduce a noise current that leaks and flows from the first ground layer 12 to the conductor 24 through the stray capacitance 23 or the like. Therefore, it is possible to suppress common mode noise that is generated in the conductor 24.

With the flat wiring 10 according to the embodiment of the disclosure, a structure in which the width W1 of the power supply layer 11 in the short direction sandwiched between the first ground layer 12 and the second ground layer 13 is smaller than the width W2 of the first ground layer 12 in the short direction and the width W3 of the second ground layer 13 in the short direction is made, whereby the electric lines of force 30 that are radiated from the power supply layer 11 are made to be easily coupled to the first ground layer 12 or the second ground layer 13. With this, it is possible to reduce the electric lines of force 30 that are coupled to the conductor 24 close to the flat wiring 10. Therefore, it is possible to suppress radiation noise that is generated in the conductor 24.

The flat wiring 10 according to the embodiment includes the two paths of the first ground layer 12 and the second ground layer 13 as a ground layer in a redundant manner. With the redundant configuration, for example, even though one ground layer is interrupted due to disconnection or the like, an effect capable of continuing power supply through the remaining ground layer is obtained.

The disclosure is usable in a flat wiring including a plurality of layers.

What is claimed is:

1. A flat wiring structure including a plurality of layers, the flat wiring structure comprising:
   a power supply layer; and
   a first ground layer and a second ground layer laminated with the power supply layer sandwiched between the first ground layer and the second ground layer, wherein
   in a plan view of the flat wiring structure when viewed from a direction along a lamination direction of the first ground layer, the power supply layer, and the second ground layer, the power supply layer has a width in a short direction smaller than those of the first ground layer and the second ground layer, and the power supply layer is provided at a position covered with the first ground layer and the second ground layer.

2. The flat wiring structure according to claim 1, wherein a width of the first ground layer in the short direction and a width of the second ground layer in the short direction are set to be equal to or greater than two times the width of the power supply layer in the short direction.

3. The flat wiring structure according to claim 1, wherein:
   the power supply layer is a strip-shaped flat plate member made of a conductive metal material,
   the first ground layer is a strip-shaped flat plate member made of a conductive metal material; and
   the second ground layer is a strip-shaped flat plate member made of a conductive metal material.

4. The flat wiring structure according to claim 1, wherein:
   the first ground layer and the power supply layer are electrically insulated from each other; and
   the power supply layer and the second ground layer are electrically insulated from each other.

* * * * *